United States Patent
Hsu

(10) Patent No.: US 8,432,264 B1
(45) Date of Patent: Apr. 30, 2013

(54) MOTION-ACTIVATED REMOTE CONTROL BACKLIGHT

(75) Inventor: Roger Hsu, Palo Alto, CA (US)

(73) Assignee: TiVo Inc., Alviso, CA (US)

( * ) Notice: Subject to any disclaimer, the term of this patent is extended or adjusted under 35 U.S.C. 154(b) by 261 days.

(21) Appl. No.: 12/842,904

(22) Filed: Jul. 23, 2010

(51) Int. Cl.
*G05B 11/01* (2006.01)

(52) U.S. Cl.
USPC ........................... 340/12.22; 340/4.11

(58) Field of Classification Search ............ 340/426.13, 340/4.11, 12.22, 539.14; 702/104; 345/161
See application file for complete search history.

(56) References Cited

U.S. PATENT DOCUMENTS

| | | | | |
|---|---|---|---|---|
| 5,425,649 A * | 6/1995 | Reymond | ...................... | 439/189 |
| 6,404,409 B1 * | 6/2002 | Solomon | ......................... | 345/31 |
| 6,641,482 B2 * | 11/2003 | Masuyama et al. | ............. | 463/44 |
| 7,167,122 B2 * | 1/2007 | Stefanik | ........................ | 341/176 |
| 7,412,348 B2 * | 8/2008 | Okamura | ........................ | 702/152 |
| 7,474,103 B2 * | 1/2009 | Yamada et al. | ................ | 324/426 |
| 7,852,255 B2 * | 12/2010 | Rapisarda | ...................... | 341/176 |
| 7,940,986 B2 * | 5/2011 | Mekenkamp et al. | ......... | 382/181 |
| 8,134,475 B2 * | 3/2012 | Reams | ....................... | 340/815.4 |
| 8,214,167 B2 * | 7/2012 | Dohta | ........................... | 702/104 |
| 2003/0080924 A1 * | 5/2003 | Bentley | ........................... | 345/31 |
| 2007/0299623 A1 * | 12/2007 | Gandelsman et al. | .......... | 702/95 |
| 2008/0014835 A1 * | 1/2008 | Weston et al. | ................. | 446/484 |
| 2008/0034331 A1 * | 2/2008 | Josephsoon et al. | .......... | 715/863 |
| 2009/0143110 A1 * | 6/2009 | Armstrong | .................... | 455/566 |

OTHER PUBLICATIONS

Harmony One Advanced Universal Remote—User Manual, Version 1.0 (Aug. 30, 2007) 39 pages.

* cited by examiner

*Primary Examiner* — Jennifer Mehmood
*Assistant Examiner* — Rufus Point
(74) *Attorney, Agent, or Firm* — Hickman Palermo Truong Becker Bingham Wong LLP

(57) ABSTRACT

An apparatus for performing remote control operations is provided. A remote control detects a particular movement, and performs operations based on the detected movement.

11 Claims, 5 Drawing Sheets

MOTION-ACTIVATED REMOTE CONTROL BACKLIGHT

FIELD OF THE INVENTION

The present invention relates to remote controls. Specifically, the present invention relates to motion activated features of remote controls.

BACKGROUND

Remote controls provide to users a convenient way to control the functions of home entertainment equipment, including televisions, receivers, cable equipment, blu-ray players, and digital video recorders, such as those created by TiVo Inc. of Alviso, Calif. Although device-specific remote controls are provided with many components, other components provide "universal" remote controls that are capable of controlling more than one device.

Some remote controls have a "backlight" feature. Typically, a backlight provides a light that shines behind translucent buttons of a remote control in order to make the buttons more visible in the dark. Some remote controls use a dedicated backlight button. The added button adds to visual clutter, resulting in user confusion. In addition, users of the remote control must find the backlight button in order to invoke the feature. One way of accomplishing this is to use glow-in-the-dark materials on the backlight button. However, glow-in-the-dark materials reduce the aesthetic quality of the remote control. Further, these materials must be exposed to light to achieve the glow-in-the-dark effect, and most remote controls are found somewhere between the sofa cushions, reducing or eliminating exposure to light.

Some remote controls combine features. For example, the pressing of any button, on some remote controls, results in the invocation of the backlight feature. This allows the user to see subsequent buttons, but still requires the user to press a first button. However, if the first button a user presses is the wrong button, then an undesirable effect may occur, thereby interrupting the user's experience. Users may "work around" this problem by covering the source of the signal emanated by the remote control, but this requires two-handed operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

In an embodiment, a remote control comprises a processor, motion detection sensor, and a signal generator. The remote control additionally has motion detection logic, which is coupled to the motion detection sensor as well as the processor. The motion detection logic is configured to receive movement sensory information from the motion detection sensor. Based on the movement sensory information, the motion detection logic detects one or more particular movements that have been applied to the motion detection sensor. The motion detection logic is also configured to disregard movements that do not match the configuration. Upon detection of one or more particular movements, control logic is configured to activate a light that is coupled to the control logic, activate the signal generator, or establish a new configuration associated with the motion detection logic.

In an embodiment, the motion detection sensor comprises a first stationary sensor member and a second sensor member that is configured to make contact with the first sensor member upon movement of the motion detection sensor.

Structural and Functional Overview

Figure 1:
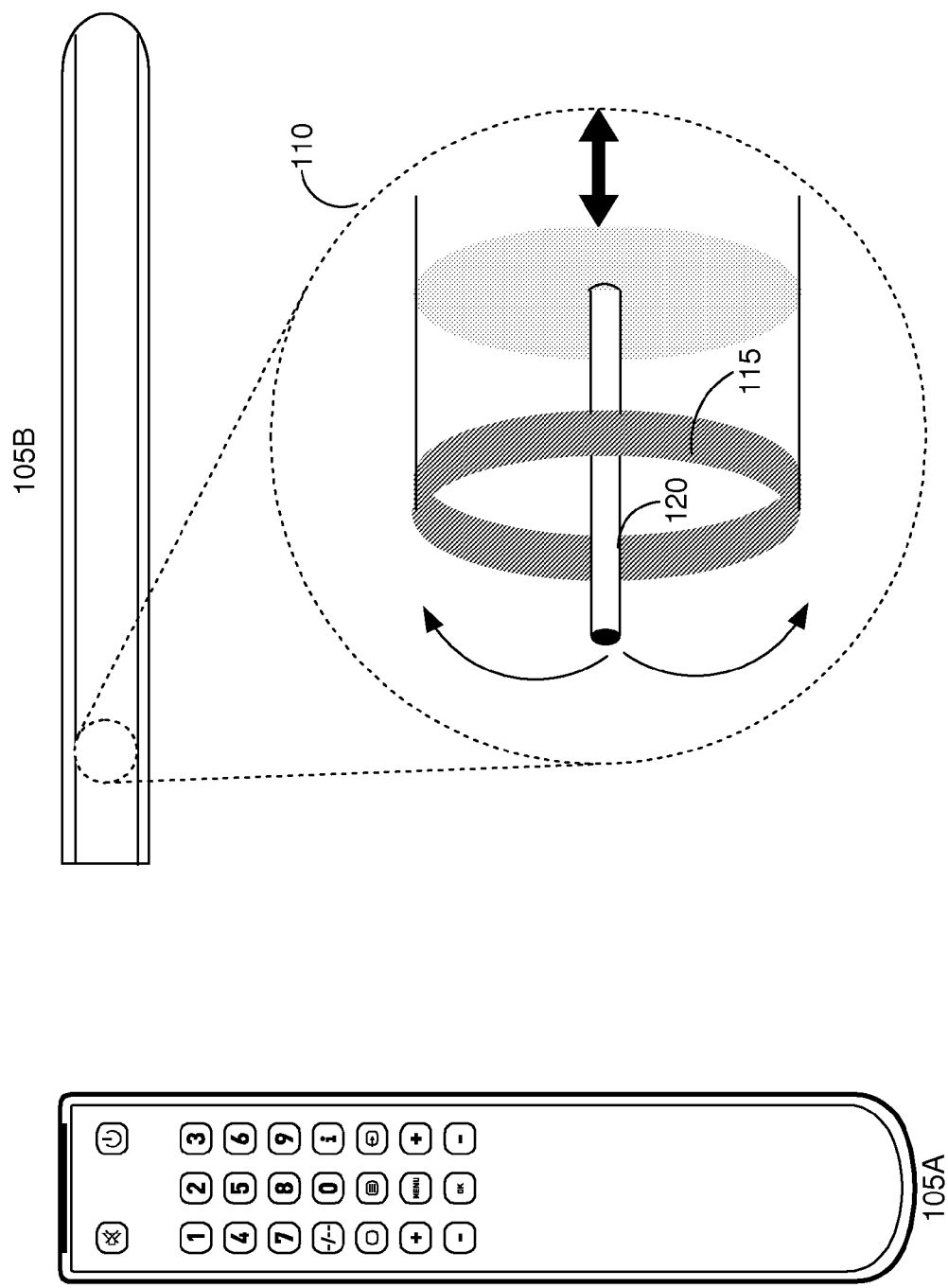
FIG. 1 is a diagram illustrating an example remote control with an embodiment of a motion detection sensor.

FIG. 1 is a diagram illustrating an example remote control 105 with an embodiment of a motion detection sensor 110. Motion detection sensor 110 is affixed to remote control 105 and comprises two sensor members: a stationary outer conductive member 115 and a mobile, movable or flexible inner conductive member 120. Outer conductive member 115 need not be absolutely stationary, but is stationary with respect to inner conductive member 120, which should exhibit more movement capability. Inner conductive member 120 moves with respect to outer conductive member 115 when a force is applied to motion detection sensor 110. When sufficient force is applied to motion detection sensor 110, inner conductive member 120 moves to come in contact with outer conductive member 115.

Although outer conductive member 115 is depicted in the diagram as a ring, it may take any shape, such as a square, triangle, or half-circle, as long as inner conductive member 120 is capable of coming into contact with outer conductive member 115 given sufficient force. Likewise, inner conductive member 120 may have a different shape than the shape depicted. For example, inner conductive member 120 may be reverse conical in shape, having a flexible base that allows movement. The free end of the inner conductive member 120 has enough weight to cause the inner conductive member 120 to flex along its shaft when force is applied to motion detector sensor 110.

Figure 2:
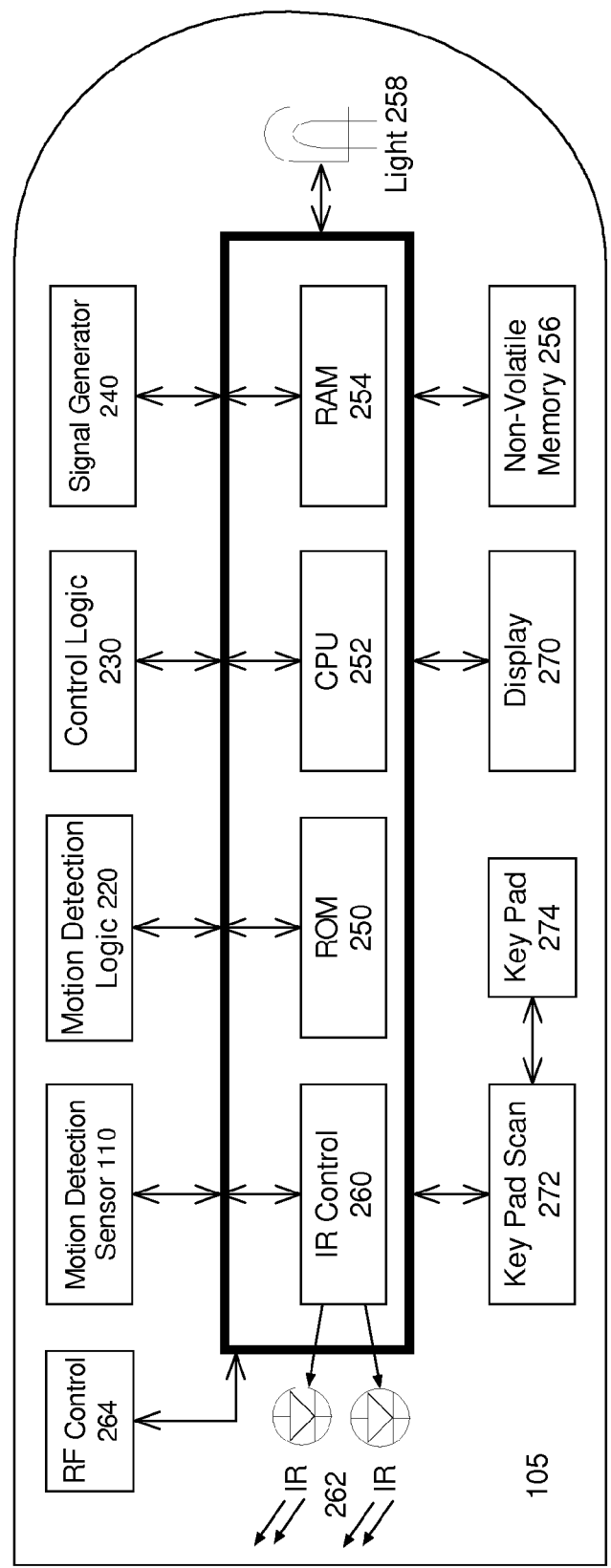
FIG. 2 is a high-level block diagram illustrating an embodiment of a remote control on which the invention may be implemented.

FIG. 2 is a high-level block diagram illustrating additional aspects of example remote control 105. To increase clarity, some features of remote control 105 are not shown. In an embodiment, the remote control device 105 generally represents any device with a user interface to receive user commands for operating one or more media devices. remote control device 105 may include hardware and/or software to perform the functions described herein. Although FIG. 2 shows specific components of an embodiment, some of these components may not be necessary to perform the functions described herein. Furthermore, components not shown may be used to perform functionality described herein.

The remote control device 105 may be communicatively coupled to one or more media devices through wired and/or wireless segments. The remote control device 105 may communicate wirelessly over one or more of: radio waves (e.g., wi-fi signal, Bluetooth signal), infra-red waves, over any other suitable frequency in the electro-magnetic spectrum, over a network connection (e.g., intranet, internet, etc.), or through any other suitable method.

In an embodiment, the remote control device 105 may include Read Only Memory (ROM) 250, a Central Processing Unit (CPU) 252, Random Access Memory (RAM) 254, Infrared Control Unit 260 for generating IR signals based on signals received from signal generator 240, a key pad scan 272, a key pad 274, Non-Volatile Memory (NVM) 256, an Infrared (IR) blaster 262 for sending IR signals, a Radio Frequency (RF) control 264 for generating RF output sent by an RF interface (not shown), and a QWERTY sliding keyboard (not shown). The remote control device 105 may additionally include any of: a Wi-Fi radio, touchpad, trackball, accelerometer, camera, light sensor, or proximity sensor. Memory on the remote control device 105 (e.g., ROM 250, RAM 254, or NVM 256) may include control codes and/or key codes for one or more media devices. The memory may include a Run-Length-Limited (RLL) waveform table or other commands which may be in a compressed or uncompressed form.

In an embodiment, the remote control device 105 includes one or more displays 270. The displays may be touch screen displays that include functionality to receive user input by a user touching the display screen.

Motion detection sensor 110 is coupled to motion detection logic 220. Motion detection sensor 110 sends digital and/or analog motion sensory information to motion detection logic 220. Motion detection logic 220 is capable of distinguishing between movements of the motion detection sensor based on configurable parameters. For example, motion detection sensor may send a different signal, depending on which portion of the ring is touched by the inner conductive member 120 in response to the movement. Signal strength may also vary depending on the amount of force applied during the movement. In addition, a sequence of signals may be sent in response to a sequence of movements. Such a sequence might occur with a "shaking" motion. Motion detection logic 220 decodes each signal as it is detected based on the strength, frequency, and any other attribute of the signal that is dependent on the sensed movement.

Motion detection logic 220 is communicatively coupled to control logic 230. Motion detection logic 220 informs control logic 230 when a configured movement is detected. A configured movement may be a movement that is defined within the remote control as being associated with a particular function of the remote control. For example, a sensor within the remote control may be part of motion detection logic 220, and may detect that a "shaking" movement has occurred. The "shaking" movement may be associated with a particular remote control function. Control logic 230 may cause any remote control functionality to be invoked. For example, control logic 230 may look up the detected movement in a function association table, and cause signal generator 240 to generate an infra-red signal that is mapped to a particular function, thereby controlling a home entertainment component such as a digital video recorder. Each movement may be mapped to a different function, which may be mapped to one or more infra-red signals or other remote control features, such as a backlight. For example, control logic 230 may cause light 258 to turn on. Movement mappings may be preconfigured by the remote control manufacturer or may be configured by the user of the remote control.

Remote Control Operation

Figure 3:
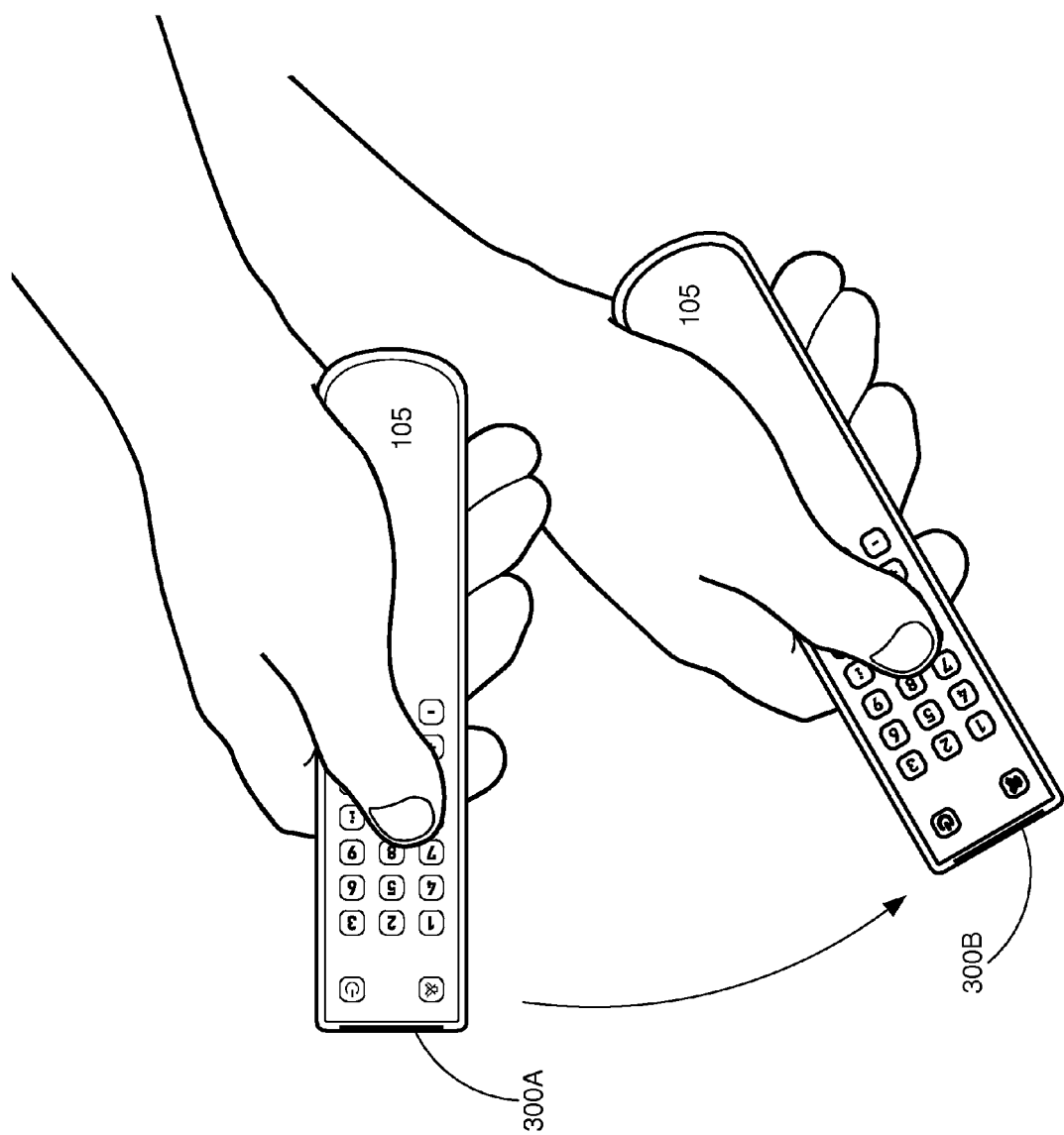
FIG. 3 is a diagram illustrating a movement that may be detected in an embodiment.

In an embodiment, remote control 105 receives a forceful movement from a user. The movement may be quick shake, a tap against another object or a flick, such as the movement depicted in FIG. 3 where the remote control 105 moves from position 300A to position 300B in a deliberate movement applied by the user.

Figure 4:
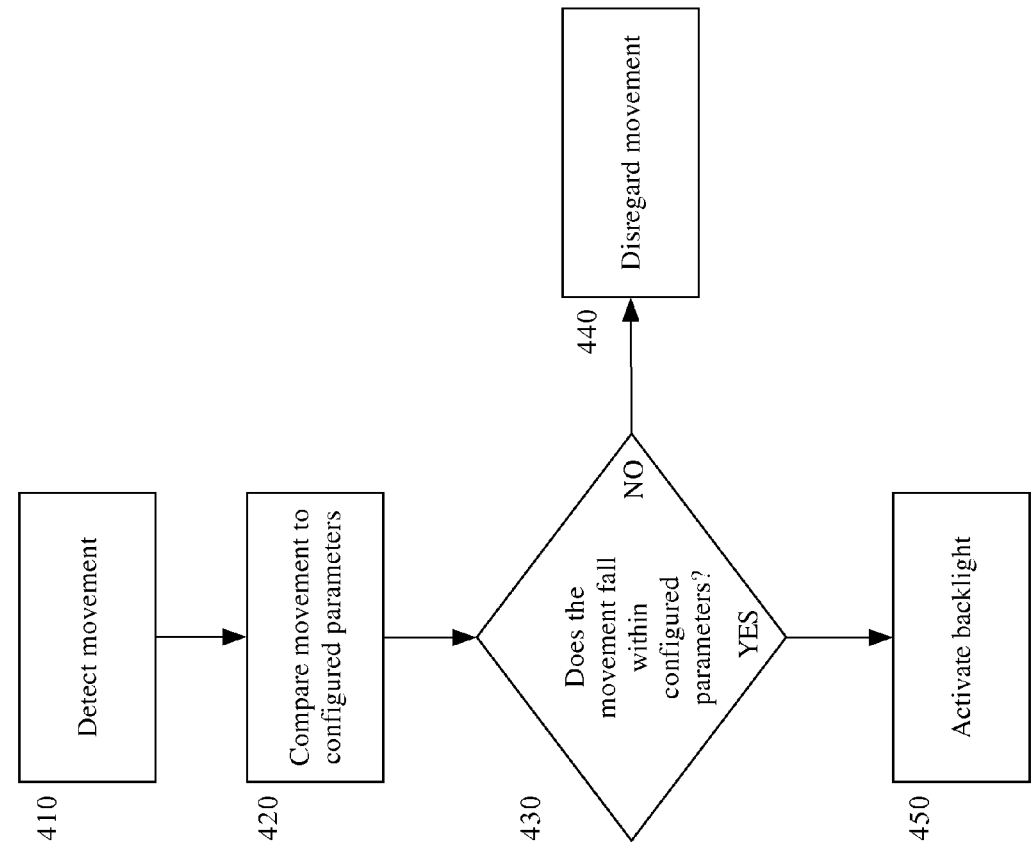
FIG. 4 is a flow diagram representing a logical decision making process performed by an embodiment of the invention.

FIG. 4 is a flow diagram depicting the operation of an embodiment. At step 410, movement is detected. Movement is detected when a user exerts a force on the remote control, such as tapping the remote control against the user's leg. The force causes inner conductive member 120 to momentarily come into contact with outer conductive member 115, which causes motion detection sensor 110 to send a signal to motion detection logic 220.

At step 420, the detected movement is compared to configured parameters, possibly stored in a memory device in the remote control 105. A variety of parameters may be defined and stored to configure detected movements. Examples of parameters include the amount of time that the sensor members are in contact with one another, the portion of outer conductive member 115 that is contacted by inner conductive member 120, the number of times that the sensor members sequentially make and lose contact with one another, or any combination of these parameters.

For example, when a remote control is tapped against a person's knee with a significant force, the amount of time that the sensor members are in contact with one another may be greater than if the remote control were lightly tapped against a pillow. A time threshold or hysteresis may be configured to make the motion detection more or less sensitive.

Also, sensor members may be divided into multiple portions, where each portion causes a unique analog or digital signal to be sent to the motion detection logic 220, enabling the motion detection logic 220 to determine which portion of the sensor has been activated. If outer conductive member 115 is ring shaped as shown in FIG. 1, but divided into distinct portions, each distinct portion of the ring would alert the motion detection logic where and when contact is made. When the remote control is moved from side to side by the user, the motion detection logic 220 will receive alternating signals from the motion detection sensor 110, indicating the back and forth movement of the remote control.

Inner conductive member 120 may also be segmented into multiple portions. For example, multiple wires, insulated from one another, may be connected to the same flexible support member. Each wire, when in contact with outer conductive member 115, may provide a unique signal to motion detection logic 220. Such segmentation may allow for detection of the angle of movement by motion detection logic 220. For example, a simple segmentation may be achieved by separating the outer conductive member 115 into four equal segments. These segments may represent up, down, left, and right movements. Each segment may send a different signal to motion detection logic 220, allowing motion detection logic 220 to determine what movement has occurred based on the signal received.

Although reference has been made to a sensor with specific features such as a ring and a flexible sensor member in an embodiment, many other types of sensors may be used. For example, digital sensors and sensors using lasers rather than moving parts may be used. In an embodiment, a ring laser gyroscope may be used. In such an embodiment, Rotation induces a small difference between the time it takes light to traverse a ring in two different directions. A separation between the frequencies of the laser beams is introduced, and the resulting interference pattern follows the rotation of the unit in the plane of the ring. A digital signal may be sent to motion detection logic 220, and patterns of movement may be compared with patterns that are mapped to one or more remote control functions.

In another embodiment, an accelerometer may be used instead of the ring sensor described herein. An accelerometer is an electromechanical device that measures acceleration forces. The constant force of gravity or forces caused by moving the accelerometer may be measured using an accelerometer. Measuring constant gravitational forces can allow the remote control to sense the angle at which the remote control is tilted with respect to the earth. Forces caused by movements allow the remote control to determine whether the remote control is being moved from side to side, up or down, shaken, or moved in other ways. A digital signal may be sent from the accelerometer, or a sensor based on an accelerometer, to motion detection logic 220, and patterns of movement may be compared with patterns that are mapped to one or more remote control functions.

A threshold may also be configured that describes detected movements, such as the number of times that sensor members have made and lost contact. For example, the configuration may specify that three shakes of the remote control are required to meet the threshold. When a user causes the sensor members to come into contact with one another and lose contact with one another three times, in sequence, the requirement is met, and the movement may be considered to be detected. The frequency of contacts may also be used as a threshold. For example, the number of contacts made within a certain time period may be used to determine the force of the movement. A minimum force may be required to activate a feature of the remote control to distinguish intentional sensor activation from accidental or unintentional sensor activation.

Multiple parameters may be stored in memory. For example, motion detection logic 220 may be configured to detect multiple movements and provide a unique communication to control logic 230 for each signal. A side to side movement may trigger one communication while an up and down movement may provide another. Complex combinations of signals, even from multiple sensors, may be interpreted by motion detection logic 220.

At step 430, the motion detection logic determines whether the detected movement falls within configured parameters. If the movement does not fall within configured parameters, the movement is disregarded in step 440.

If the movement falls within configured parameters, the movement information is transmitted to control logic 230. Control logic 230 performs a remote control operation based on the type of movement detected. For example, in step 450, control logic 230 activates the remote control backlight. Another example of operations that may be performed by control logic 230 in response to a configured and detected movement includes activating a signal generator 240, such as an infra-red, or radio frequency (RF) signal generator capable of transmitting instructions to a home entertainment device, such as a digital video recorder, television, or multimedia computer. In an embodiment, one or more movements of the remote control device may correspond to a command for displaying menu choices by a media device (e.g., digital video recorder, receiver, or computing device). For example, one or more movements may correspond to a command for shuffling menu choices displayed on a television or computer screen. The menu choices may correspond to a choice between multimedia content available for playing (e.g., video and/or sound files). In response to detecting a movement, a command is sent to the media device. In response to receiving the command, the media device performs the requested action. For example, the movement may cause the media device to shuffle available choices at random (e.g., new sequence of choices or new choices altogether). The movement may cause the media device to select a new set of choices based on user information (e.g., user preferences, user history, etc.). The movement may correspond to a command for displaying media content that is similar to the media content currently being displayed. For example, if a user shakes the remote control device while watching a particular television program, media device A may respond by playing a different television program that is similar to the particular television program being watched.

More than one operation may be performed by the remote control 105 upon the detection of a particular movement. For example, shaking the remote control 105 one time my result in the remote control sending a series of infra-red signals designed to turn off a television, an audio/visual receiver, and a digital video recorder. These functions may be configured to be performed based on stored state information that describes the state of a particular device. For example, if the remote control 105 has state information about a DVD player that shows that the DVD player is not turned on, then the control logic may avoid sending the "off" signal for the DVD player, while still sending the signal for other devices known to be turned on.

In addition, the motion detection sensor 110 may be configured based on a detected movement. For example, in an embodiment, a user may set the sensitivity of the backlight function by shaking the remote control 105 ten times, waiting for a flashing light to indicate that the remote control 105 is in "configuration mode," and then tapping the remote against her thigh to indicate the desired sensitivity of the backlight function. In response, the control logic will set the sensitivity configuration of the backlight function to match, or be based on, the force required to tap the remote control 105 against the user's thigh.

The motion detection sensor 110 may also be configured through the use of buttons on the remote control 105. Configuration using buttons may be used exclusively, or in conjunction with movement detection as discussed above.

In an embodiment, remote control 105 may have multiple motion detection sensors 110. Each motion detection sensor may be set at a different sensitivity level, allowing the user to select which sensor to use, thereby selecting the sensitivity desired by the user.

The motion detection sensor 110 may also be replaced or added to one or more "expansion" ports of the remote control 105 in an embodiment. For example, sensors having different properties, detection mechanisms, and signal generation capabilities may be removed and replaced in the same manner as batteries, memory cards, or cartridges. Each sensor may be customized for a particular movement or sensitivity level. These modular sensors may comprise features of motion detection logic 220 and control logic 230, in order to provide additional, improved, or updated functionality to remote control 105. For example, a new software feature of a digital video recorder may benefit from a particular sensitivity and movement of a sensor 110. In an embodiment, the user simply plugs the new sensor 110 into the remote control 105.

In addition, the motion detection sensor 110 may be physically configurable by the user through the use of a dial or other mechanism on the remote control 105. For example, inner conductive member 120 may be advanced further into outer conductive member 115 by a dial or controller, resulting in the need for additional force to cause contact to occur between the sensor members. For example, if the distance between the base of member 120 and outer conductive member 115 is increased, then member 120 will be required to bend more to contact member 115. Thus, the motion detection sensor may be configured to disregard movements that are not desired movements through physical configuration of the sensor 110, or through configuration of the motion detection logic 220 or control logic 230.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
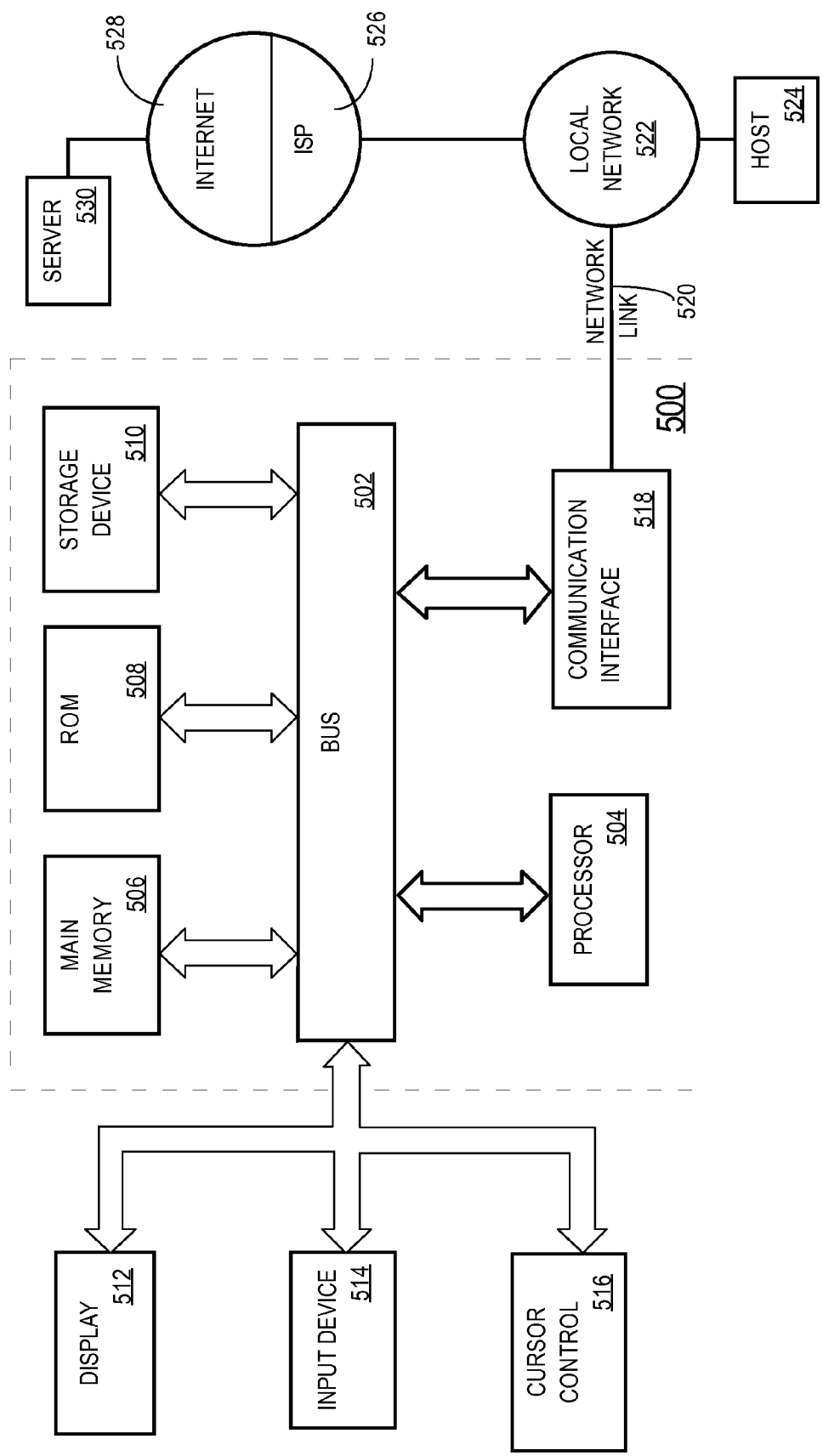
FIG. 5 illustrates a computer system on which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A remote control, comprising:
a signal generator;
a motion detection sensor;
motion detection logic coupled to a processor and the motion detection sensor, configured to receive movement sensory information from the motion detection sensor, and detect, based at least in part on the movement sensory information, one or more particular movements that have been applied to the motion detection sensor;
a control logic coupled to the motion detection logic, configured to perform, upon detection of the one or more particular movements, at least one of:
activate a light that is electrically coupled to the control logic;
activate the signal generator; or
establish a new configuration associated with the motion detection logic;
wherein the motion detection logic is further configured to disregard movements that are not the one or more particular movements;
wherein the motion detection sensor comprises:
a first stationary sensor member;
a second flexible sensor member, wherein at least a portion of the second sensor member is within a particular distance to the first sensor member such that the second sensor member is configured to make contact with the first sensor member upon movement of the motion detection sensor.

2. The remote control of claim 1, wherein the motion detection sensor is configured to detect the particular movement when a particular portion of the first sensor member is in contact with the second sensor member or when a particular portion of the second sensor member is in contact with the first sensor member.

3. The remote control of claim 1, wherein the motion detection sensor is configured to detect the particular movement when the first sensor member and the second sensor member are in contact with one another for an amount of time that falls within a particular threshold.

4. The remote control of claim 1, wherein the motion detection sensor is configured to detect the particular movement when:
a first connection is made between the first and second sensor members;
the first connection is broken; and
after the first connection is broken, a second connection is made between the first and second sensor members.

5. The remote control of claim 1, wherein:
the first sensor member comprises a ring; and
at least a portion of the second sensor member passes through the ring of the first sensor member.

6. The method of claim 5, wherein:
the ring comprises a plurality of segments; and
the motion detection logic is configured to detect the direction or angle of the particular movement based at least in part on which segment of the plurality of segments is contacted by the second sensor member.

7. The remote control of claim 1, wherein establishing a new configuration associated with the motion detection logic comprises one of:
establishing a time threshold required to detect the particular movement based on the length of time the first sensor member is in contact with the second sensor member;
establishing a particular portion of the first sensor member required to come into contact with the second sensor member in order to detect the particular movement based on the portion of the first sensor member contacted by the second sensor member; or
establishing a particular portion of the second sensor member required to come into contact with the first sensor member in order to detect the particular movement based on the portion of the second sensor member in contact with the first sensor member.

8. The remote control of claim 1, wherein the signal generator is an infra-red or radio frequency signal generator.

9. The remote control of claim 1, wherein activating the signal generator comprises causing the signal generator to send one or more infra-red or radio frequency signals.

10. The remote control of claim 9, wherein the control logic is further configured to:
match the one or more particular movements with one or more particular stored operations;

match the one or more particular stored operations with one or more particular infra-red or radio frequency signals;

cause the signal generator to send a first signal of the one or more particular signals.

11. The remote control of claim 1, wherein activating a light comprises activating a backlight.

\* \* \* \* \*